United States Patent
Bishop

[15] 3,653,657
[45] Apr. 4, 1972

[54] SELF-CONTAINED AMUSEMENT RIDE

[72] Inventor: Richard W. Bishop, 4563 Lewis Ave., Toledo, Ohio 43612

[22] Filed: Feb. 4, 1971

[21] Appl. No.: 112,707

[52] U.S. Cl. ................................... 272/29, 272/37, 272/51
[51] Int. Cl. ........................................... A63g 1/08
[58] Field of Search ...................... 272/29, 37, 39, 51, 33 R

[56] References Cited

UNITED STATES PATENTS

| | | | |
|---|---|---|---|
| 1,090,065 | 3/1914 | Jacobs | 272/29 UX |
| 3,078,090 | 2/1963 | Thomas | 272/29 |
| 3,140,092 | 7/1964 | Hrubetz | 272/37 X |
| 3,459,422 | 8/1969 | Winton | 272/29 X |
| 3,552,747 | 1/1971 | Deem | 272/29 |

FOREIGN PATENTS OR APPLICATIONS 838,961  6/1960  Great Britain ........................ 272/29

*Primary Examiner*—Anton O. Oechsle
*Assistant Examiner*—Arnold W. Kramer
*Attorney*—Allen D. Gutchess, Jr.

[57] ABSTRACT

An amusement ride is provided which is self-contained. All of the components and elements of the ride are mounted on or are a part of a single trailer. The trailer can be readily towed to a given location and the ride readied for operation by one operator in a matter of a few minutes. As such, the ride is particularly adaptable for smaller fairs and carnivals of short duration. Further, the one-man operation results in substantial labor savings, such costs otherwise rendering many rides unprofitable. The trailer is complete with a loading and unloading platform and entrance and exit ramps adjacent an operator's station.

10 Claims, 4 Drawing Figures

INVENTOR.
RICHARD W. BISHOP

INVENTOR.
RICHARD W. BISHOP
BY
Allen D. Hutchins, Jr
ATTORNEY

INVENTOR.
RICHARD W. BISHOP
BY
Allen D. Gutchess Jr.
ATTORNEY

SELF-CONTAINED AMUSEMENT RIDE

This invention relates to an amusement device and more particularly to an amusement ride which is self-contained on a vehicle.

Amusement rides which are temporarily stationed at carnivals and fairs are transported on vehicles from one site to another. In some instances, most of the components of the ride are carried on a single vehicle but the vehicle forms only a partial support, if any, for the overall ride. Even these rides require considerable amount of time and labor to be set up for operation after reaching the site.

The present invention provides a self-contained amusement ride in which all components and elements thereof are mounted on one vehicle which can be set up for operation by one operator in a matter of a few minutes. The ride is particularly adaptable for smaller fairs and carnivals, especially those of short duration, such as one or a few days. The new amusement ride is all part of a single trailer, including a rotatable arm mounted on the trailer with rider receptacles on the ends of the arm and with the drive engine, and even a fuel tank for the engine, all mounted on the trailer. The trailer is supported on rear wheels and the front is supported directly on the ground to place the trailer frame at a substantial angle to the ground and enhance the thrill of the ride.

The trailer frame even forms a loading and unloading platform at the forward end, above which platform is positioned the rider receptacles when they are to be loaded or unloaded. An entrance ramp is also located on the trailer at one side of the loading and unloading platform and an exit ramp is located on the other side of the loading and unloading platform, so that even these elements of the ride are contained on the trailer. Further, an operator's station is located in front of the loading and unloading platform to enable the operator to control operation of the ride, position the rider receptacles for loading and unloading, direct riders out of the receptacles as well as into them, and take tickets, all from one location.

The operator can also be the one who drives the tractor which tows the trailer to the fair or carnival site. He can disconnect the trailer, lower the front end to the ground, and ready the ride for operation in a matter of about 10 minutes. Hence, time and labor are held to a minimum, rendering even a one-night stand practical.

It is, therefore, a principal object of the invention to provide a self-contained amusement ride.

Another object of the invention is to provide an amusement ride which can be set up in a short time by one man.

Still another object of the invention is to provide a self-contained amusement ride carrying its own loading and unloading platform, and exit and entrance ramps.

Yet a further object of the invention is to provide a self-contained amusement ride having an operator's station located adjacent a loading and unloading platform with adjacent entrance and exit ramps whereby one operator can operate the ride and control loading, unloading, and ticket taking.

Other objects and advantages of the invention will be apparent from the following detailed description of a preferred embodiment thereof, reference being made to the accompanying drawings, in which.

Figure 1:
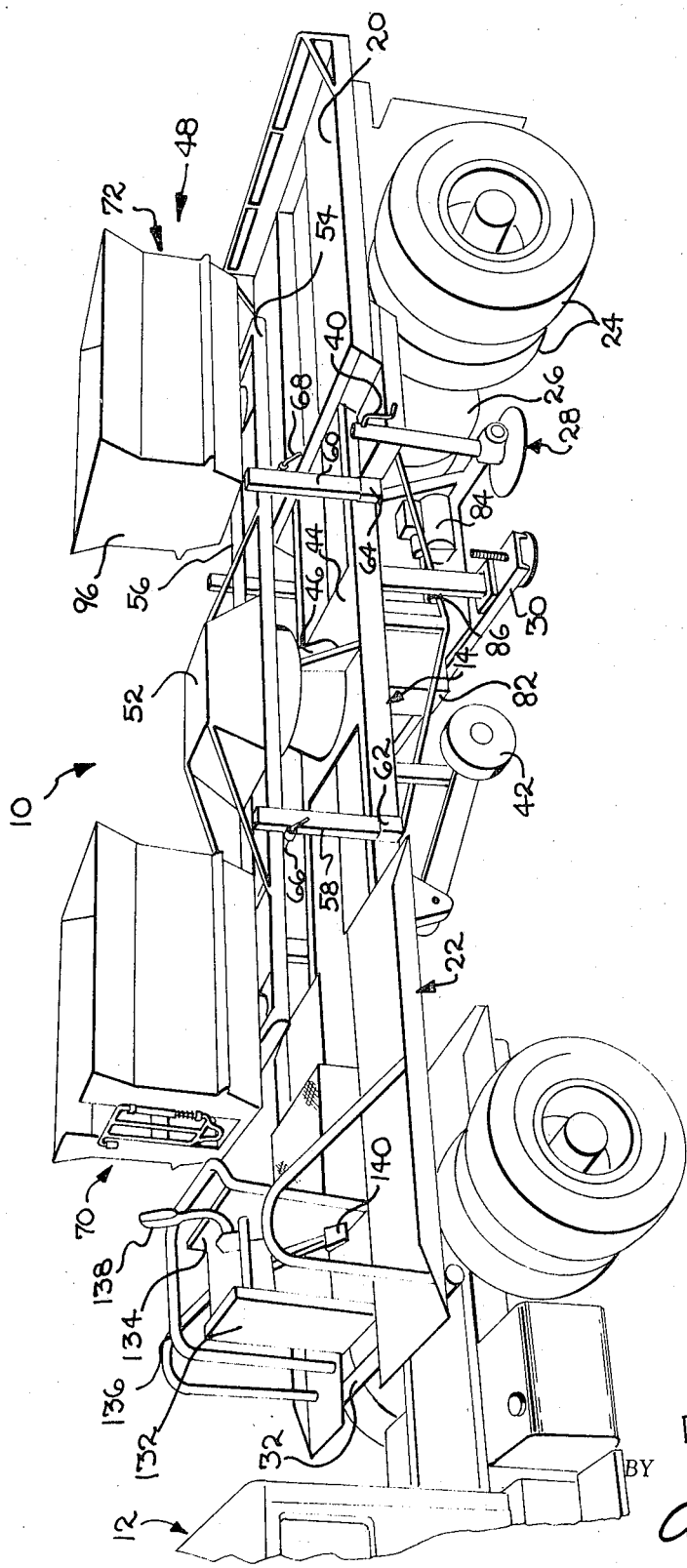
FIG. 1 is a somewhat schematic, overall view in perspective of a self-contained amusement ride according to the invention, connected to a towing vehicle.

Referring to the drawings, and particularly to FIG. 1, a trailer or towed vehicle embodying an amusement ride according to the invention is indicated at 10 and is moved from location to location by a towing vehicle, specifically shown as a tractor 12 of any suitable design.

Figure 2:
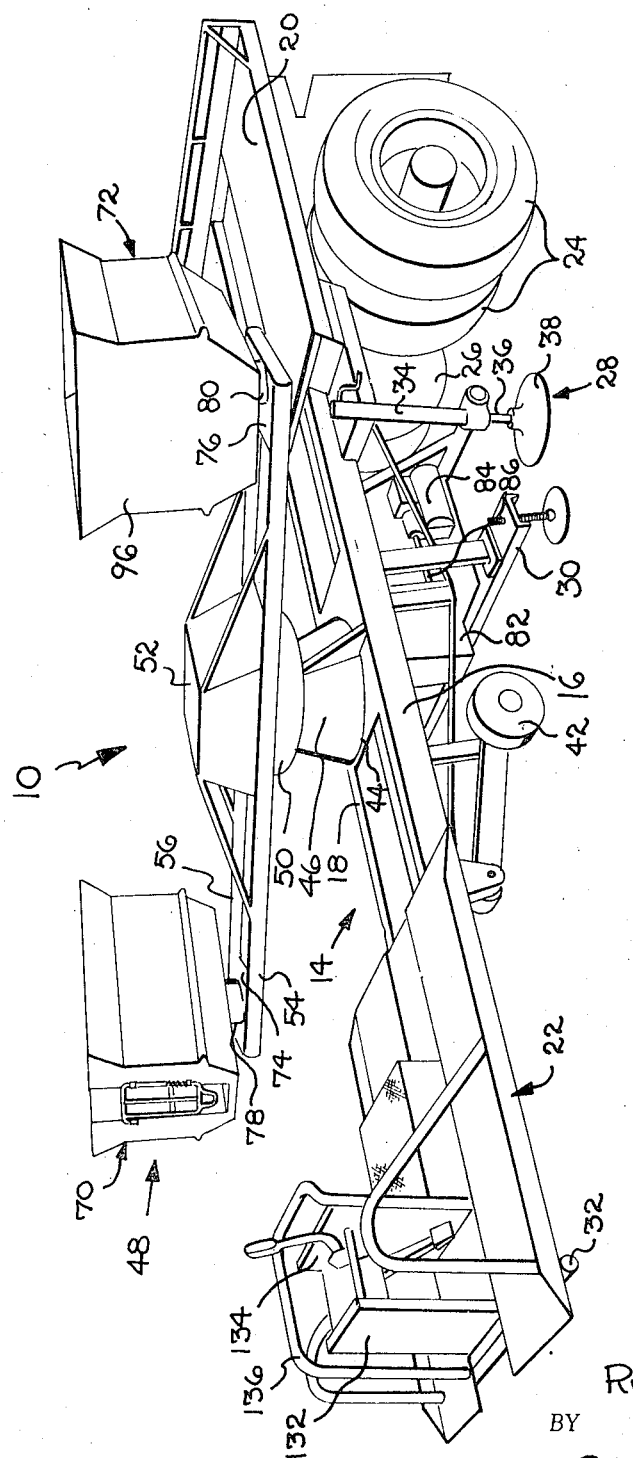
FIG. 2 is a somewhat schematic, overall view in perspective of the amusement ride of FIG. 1, in an operating position.

Referring also to FIG. 2, the trailer 10 includes a frame 14 comprising two main structural members 16 and 18. These extend between and under a rear deck or base 20 and a forward deck or base 22, which constitutes part of the frame. When the trailer is ready for operation, it is supported at several positions on the ground to maintain stability and firmness. These include rear dual tires 24 and 26, stabilizers 28, jack members 30, and a front transverse frame member 32. The stabilizers 28 are at an angle to the plane of the frame 14 so as to be substantially vertically disposed relative to the ground or other supporting surface when the trailer is in operating position. The stabilizers 28 include tubular supports 34 attached to the frame 14 and threaded rods 36 extending therethrough and terminating in feet 38. Cranks 40 at the upper ends enable the feet to be turned up and down relative to the tubular supports and the frame. The jack members 30 are of common construction and will not be discussed in detail. Neither will retractable wheels 42 located forwardly of the jack members 30 and constituting common elements of most trailers of this type.

A cross member 44 extends between central portions of the frame members 16 and 18 and has a heavy-duty thrust bearing 46. The bearing 46, in turn, carries a rotatable, rider-carrying assembly indicated at 48 on a mounting member 50. A central housing 52 is located on the member 50 and has tubular arms 54 and 56 extending outwardly therefrom in a plane generally parallel to the frame 14. The arms 54 and 56 are shorter than the length of the trailer frame 14 so that they can be positioned longitudinally with respect to the longitudinal extent of the frame 14 when the ride is being transported. In such an instance, the arms are held in that position by uprights 58 and 60 (FIG. 1) located in sockets 62 and 64 on the frame members 16 and 18 and connected by suitable bars or rods 66 and 68. The uprights 58 and 60 are readily disconnected from the bars 66 and 68 and removed from the sockets 62 and 64 when the ride is at the desired location.

In the specific form of the rider-carrying assembly 48 shown, a pair of rider-carrying receptacles 70 and 72 are rotatably mounted on cross members 74 and 76 at the end portions of the arms 54 and 56 by bearings 78 and 80. As the arms 54 and 56 are rotated, the receptacles 70 and 72 are thereby free to rotate about their own axes on the bearings 78 and 80.

The assembly 48 is driven by a shaft (not shown) which extends downwardly through the bearing 46 into a heavy-duty gear reducer 82 suspended below the frame members 16 and 18 by suitable supports. An internal combustion engine 84 is also supported below the frame members 16 and 18 and has an output shaft 86 connected to and mechanically engaged with the gear reducer 82. A fuel tank (not shown) mounted behind the rear wheels 24 and 26 supplies fuel for the engine 84, making the entire drive self-contained on the trailer 10. Of course, other rider-carrying assemblies can be employed as long as their maximum dimensions do not appreciably exceed the dimensions of the length and width of the trailer 10, when in a towing position.

Figure 4:
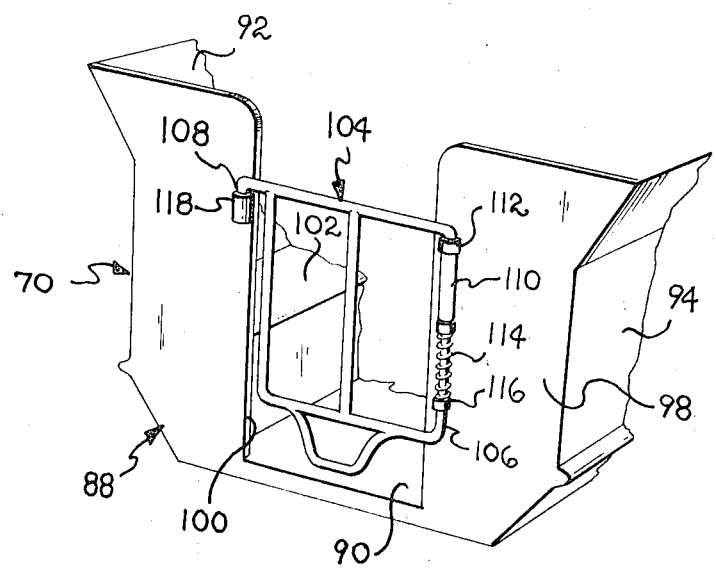
FIG. 4 is a fragmentary view in perspective of a rider-carrying receptacle used with the amusement ride.

Referring particularly to FIG. 4, the rider-carrying receptacle 70 will be discussed, this receptacle being identical to the receptacle 72. The receptacle 70 includes a shell 88 of fabricated sheet metal forming a floor 90, side walls 92 and 94, a back wall 96 (FIGS. 1 and 2), and a front wall 98 having a loading and unloading opening 100. The side walls 92 and 94 also form backs for seats 102 which extend completely between the back wall 96 and the front wall 98. With this design, each of the receptacles 70 and 72 can comfortably accommodate eight riders or patrons, four on each of the seats 102, so that the ride has a substantial capacity even though it embodies only two rider-carrying receptacles.

A door 104 is located at the loading and unloading opening 100 and includes a vertical hinge member or rod 106 at a hinge side thereof and a latch or pin member 108 spaced therefrom at the opposite side of the door. A tubular member 110 is affixed to the receptacle 70 near one side of the opening 100 and receives the hinge rod 106 which extends therethrough, the door 104 then being supported by a stop collar 112 which engages the upper end of the tubular member 110. A resilient member or coil spring 114 located around the hinge rod 106 below the tubular member 110 is in compression between the lower end of the tubular member 110 and a lower stop collar 116. The spring 114 thereby urges the door 104 downwardly with the stop 112 engaging the upper end of the tubular member 110. In this position, the latch or pin member 108 also can be received in a latch tubular member 118 on the opposite side of the opening 100, being continually urged into the member through the action of the spring 114. This arrangement enables the door to be securely shut while the ride is in motion, but it can be easily opened by an operator by simply lifting up on it to overcome the force of the spring 114, and then pivoting the door outwardly.

Figure 3:
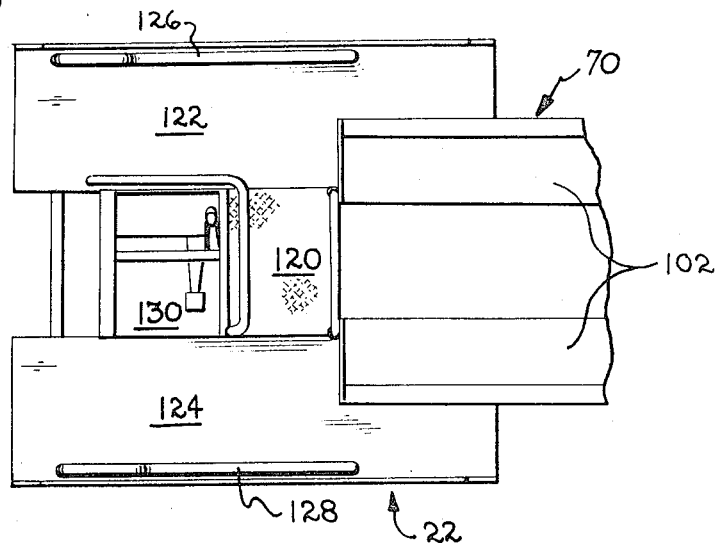
FIG. 3 is a somewhat schematic, fragmentary plan view of a forward portion of the amusement ride of FIGS. 1 and 2.

The self-contained ride also includes a loading and unloading platform, an entrance ramp, an exit ramp, and an operator's station. The latter is located adjacent the platform and ramps so that the operator can aid in unloading and loading the receptacle, take tickets, and control the movement or operation of the ride assembly. Accordingly, and referring also to FIG. 3, the forward base 22 has a raised, central loading and unloading platform 120 located centrally of the base 22 and positioned so as to be under the loading and unloading opening 100 of the receptacles 70 and 72 when the arms 54 and 56 are extending longitudinally of the trailer frame 14.

At this time, the operator can push the receptacle about its own axis, if needed, so that the opening 100 is above the platform 120. An exit ramp 122 is located to one side of the platform 120 and extends from the platform to the forward edge of the trailer frame, above the transverse support 32. Similarly, an entrance ramp 124 is located on the opposite side of the platform 120 and extends from the platform to the forward edge of the trailer frame. The forward edges of the ramps 122 and 124 are located just above the ground and provide easy access for the riders entering and exiting the ride. Suitable railings 126 and 128 are also located at the outer edges of the ramps for safety and also to direct the riders in the proper directions.

An operator's station 130 is also formed on the forward base 22. This station is located between the exit and entrance ramps 122 and 124 and is located on the side of the platform 120 outside the circular path of movement of the receptacles 70 and 72. With this arrangement, substantially from one location, one operator can position the receptacle 70 or 72 with the opening 100 above the platform 120 when the ride is finished, open the door 104 by moving it upwardly to release the latch pin 108 from the tubular member 118, and direct the riders to the exit ramp 122. He can then take tickets from the riders moving up the entrance ramp 124, direct them into the receptacle 70 or 72, see that they are properly seated, and close the door 104 by moving it upwardly and aligning the latch pin 108 with the tubular member 118. He can then operate the ride from the station 130. The station 130 includes side walls 132 and 134 and a rail 136 to keep riders away from the controls. Any suitable controls can be used; as shown, they include a throttle lever 138 and a brake pedal 140 which are substantially the only ones needed for the engine 84.

From the above, it will be seen that the self-contained ride includes substantially all the components needed for a complete ride. Although a ticket booth is not included, it is possible under some instances for the operator to also sell tickets for the ride, although more commonly, a single ticket booth is set up at a central point for several rides. Further, with the entrance and exit ramps, the feet of the riders will be cleaner prior to entering the receptacles 70 and 72, thereby reducing the need for cleaning the receptacles. Also, the ride can be set up in a location which would be unsuitable for some other rides because of soft or muddy ground conditions.

Various modifications of the above described embodiment of the invention will be apparent to those skilled in the art and it is to be understood that such modifications can be made without departing from the scope of the invention, if they are within the spirit and the tenor of the accompanying claims.

I claim:

1. A self-contained amusement ride comprising a trailer including an elongate frame, means to support said trailer on a supporting surface with a forward end of said frame at a level substantially lower than the rear end of said frame, an arm having a length shorter than the length of said frame, means rotatably supporting a central portion of said arm on a central portion of said frame, means for rotating said arm, receptacles on end portions of said arm, a loading and unloading platform at the forward end of said frame and positioned centrally thereof to be under loading and unloading openings of said receptacles when the receptacles are to be unloaded and loaded, an exit ramp on said trailer frame extending from one side of said loading and unloading platform toward a forward edge portion of said frame, and an entrance ramp on said trailer frame at the opposite side of said loading and unloading platform and extending toward the forward edge portion of said frame.

2. An amusement ride according to claim 1 characterized further by an operator's station and controls at the forward end of said frame adjacent said loading and unloading platform.

3. An amusement ride according to claim 1 characterized further by means pivotally mounting said receptacles on the end portions of said arms.

4. An amusement ride according to claim 1 characterized by positioning means holding said arm parallel to said frame when said trailer is being towed.

5. An amusement ride according to claim 1 characterized further by stabilizer means mounted on said frame intermediate the forward and rear ends for engaging the supporting surface to help maintain said trailer in a fixed position when the ride is in operation.

6. An amusement ride according to claim 1 characterized by a door for each of said receptacles having a vertical hinge member rotatably and slidably received in a tubular member affixed to said receptacle near one side of the opening, a spring on said hinge member urging said hinge member into said tubular member, said door having a pin member spaced from said hinge member, and a second tubular member affixed to said receptacle on the opposite side of the opening for receiving said pin member when the door is closed.

7. A self-contained amusement ride comprising a trailer including an elongate frame, rear wheels rotatably supported beneath said frame, means at a forward end of said frame to support said forward end on a supporting surface at a level substantially lower than the rear end of said frame, rider-carrying means movably mounted on said frame, means supported by said frame for moving said rider-carrying means, a central operator's station on said frame at a forward central portion thereof and located forwardly of the path of said rider-carrying means, an exit ramp on said frame extending along one side of said operator's station toward the forward end of said frame, and an entrance ramp on said frame extending along the opposite side of said operator's station toward the forward end of said frame.

8. An amusement ride according to claim 7 characterized by a loading and unloading platform on said frame between said operator's station and the path of the rider-carrying means and also located between said entrance and exit ramps.

9. An amusement ride according to claim 7 characterized by said rider-carrying means comprises an arm rotatably mounted on said frame and a pair of rider receptacles on end portions of said arm.

10. An amusement ride according to claim 9 characterized further by each of said receptacles having a loading and unloading opening, and a door for said opening, said door having a vertical hinge member rotatably and slidably received in a tubular member affixed to said receptacle near one side of the opening, a coil spring on said hinge member urging said hinge member into said tubular member, said door having a pin member along the opposite edge thereof, and a second tubular member affixed to said receptacle on the opposite side of the opening for receiving said pin member when the door is closed.